July 15, 1924. 1,501,248
W. J. H. STRONG
METHOD OF CONTROLLING PROPELLERS
Filed July 15, 1918 16 Sheets-Sheet 1
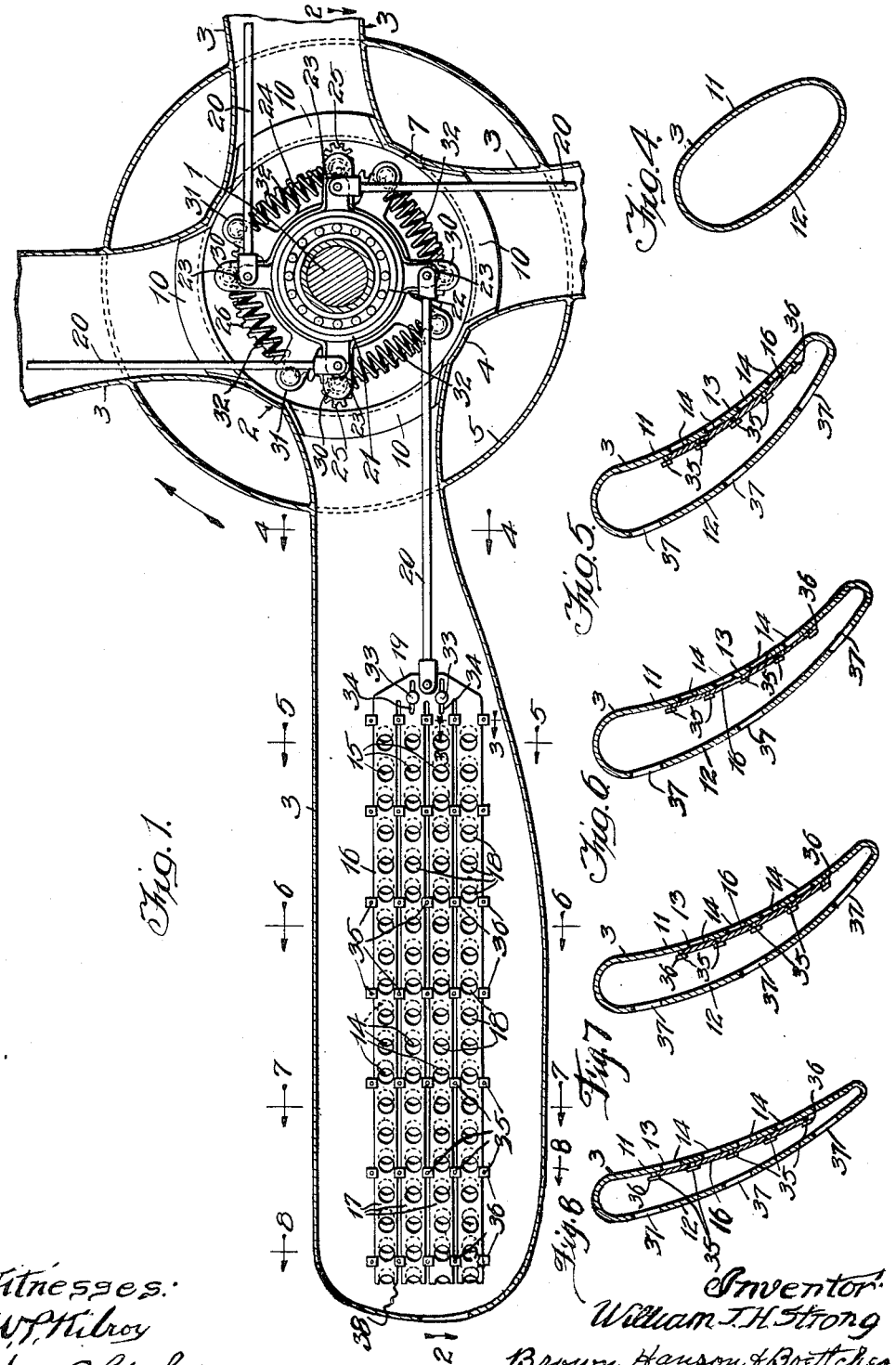
Witnesses:
W. F. Kilroy
Harry R. L. White
Inventor
William J. H. Strong
By Brown Hanson & Boettcher
Attys.

July 15, 1924.
W. J. H. STRONG
1,501,248
METHOD OF CONTROLLING PROPELLERS
Filed July 15, 1918    16 Sheets-Sheet 2
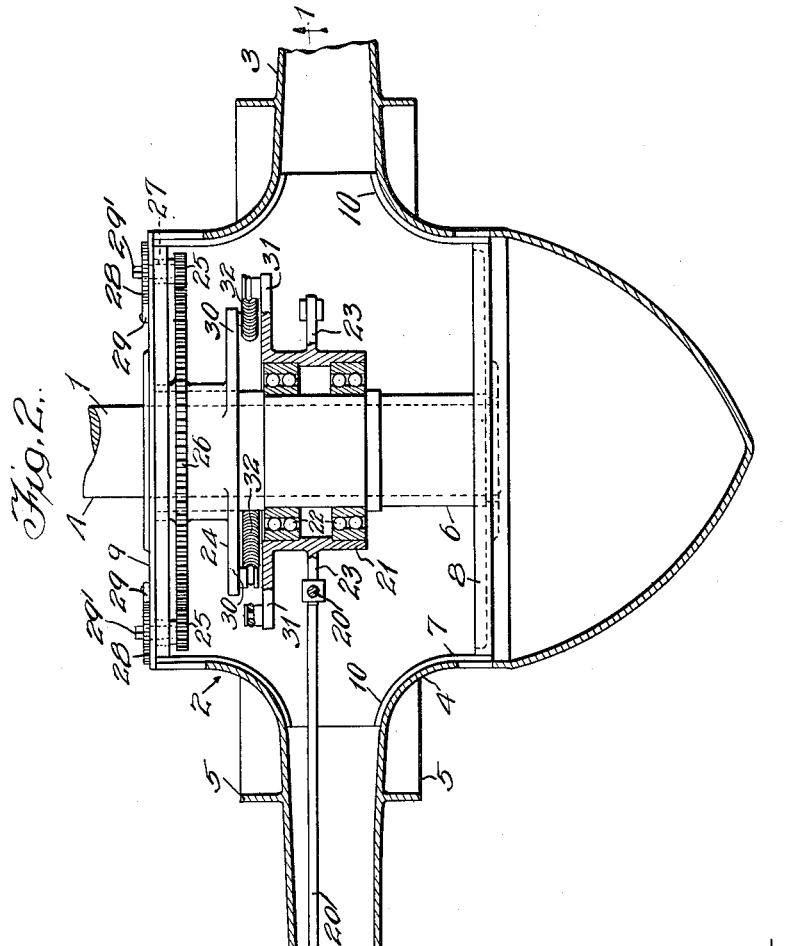

July 15, 1924.　　　W. J. H. STRONG　　　1,501,248
METHOD OF CONTROLLING PROPELLERS
Filed July 15, 1918　　16 Sheets-Sheet 3
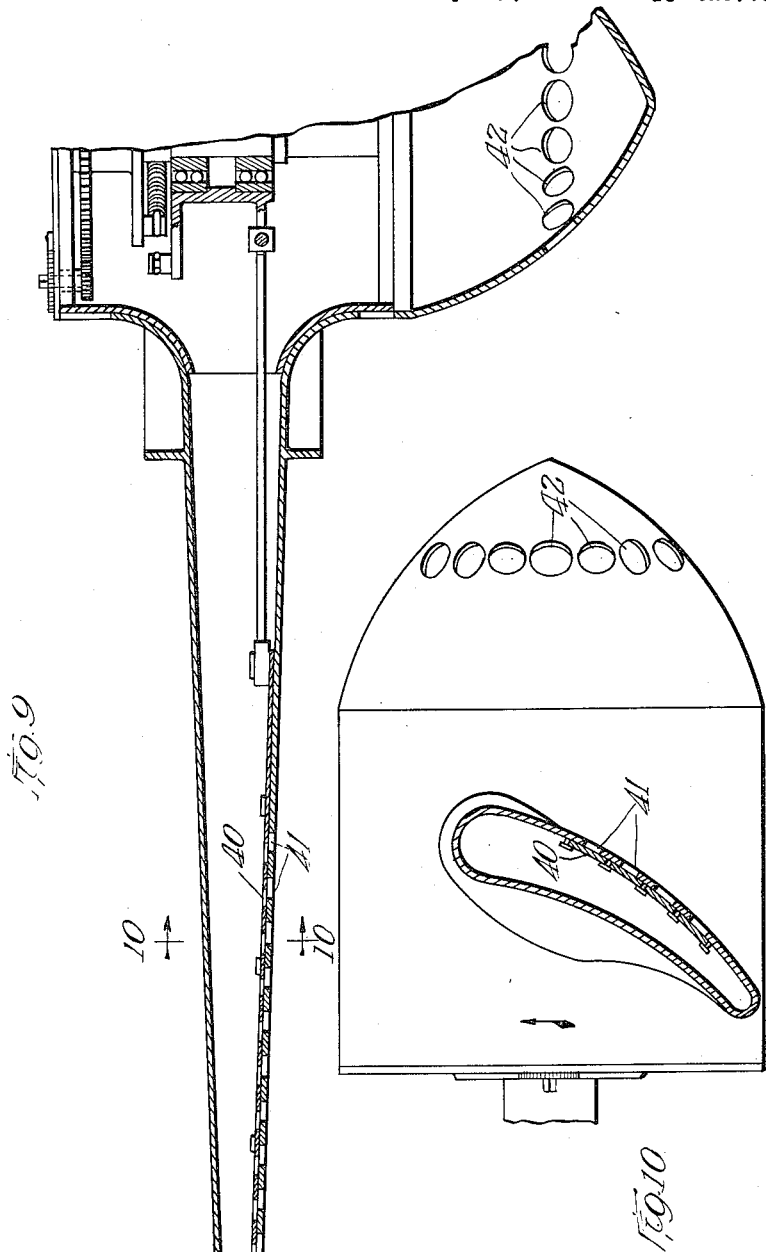

July 15, 1924.
W. J. H. STRONG
1,501,248
METHOD OF CONTROLLING PROPELLERS
Filed July 15, 1918   16 Sheets-Sheet 4
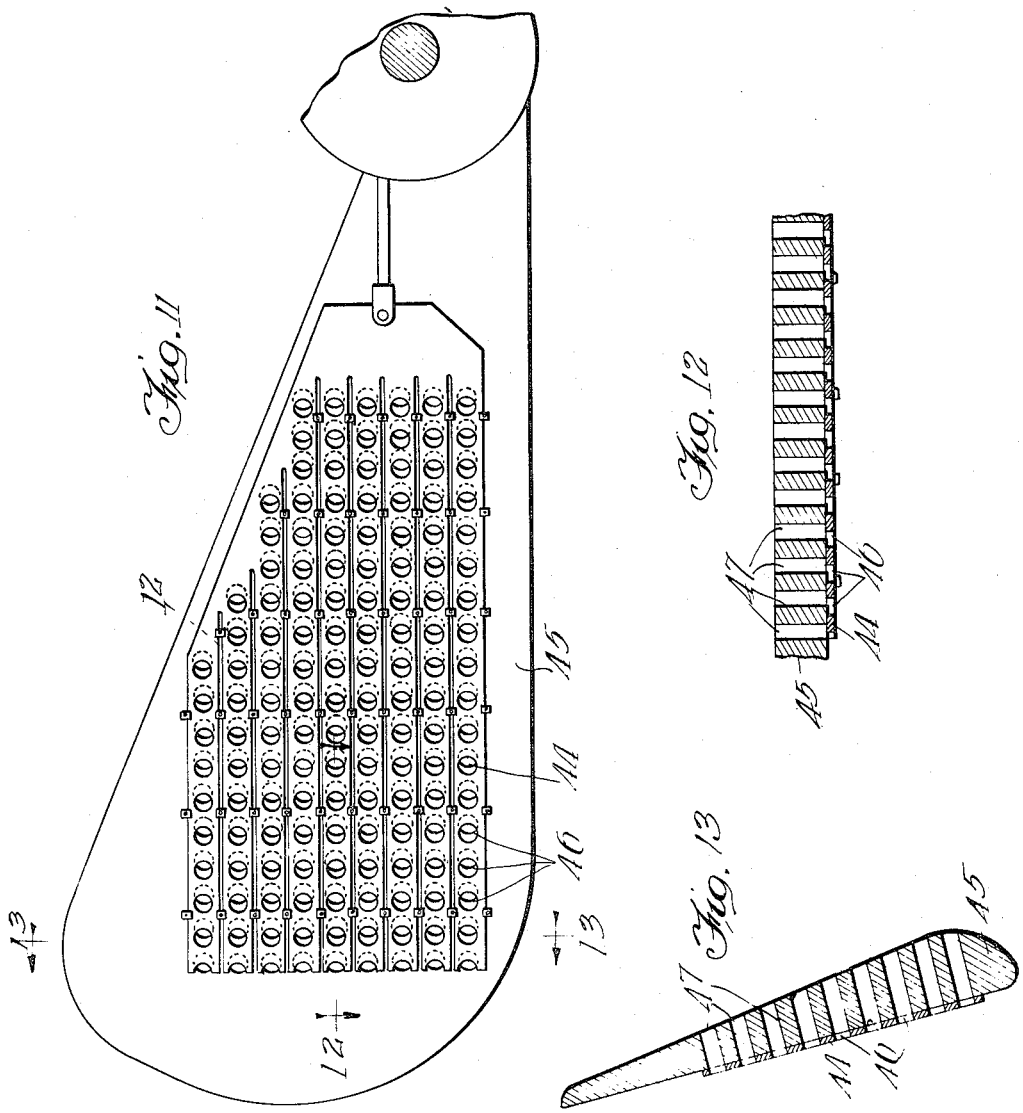

July 15, 1924.
W. J. H. STRONG
1,501,248
METHOD OF CONTROLLING PROPELLERS
Filed July 15, 1918   16 Sheets-Sheet 5
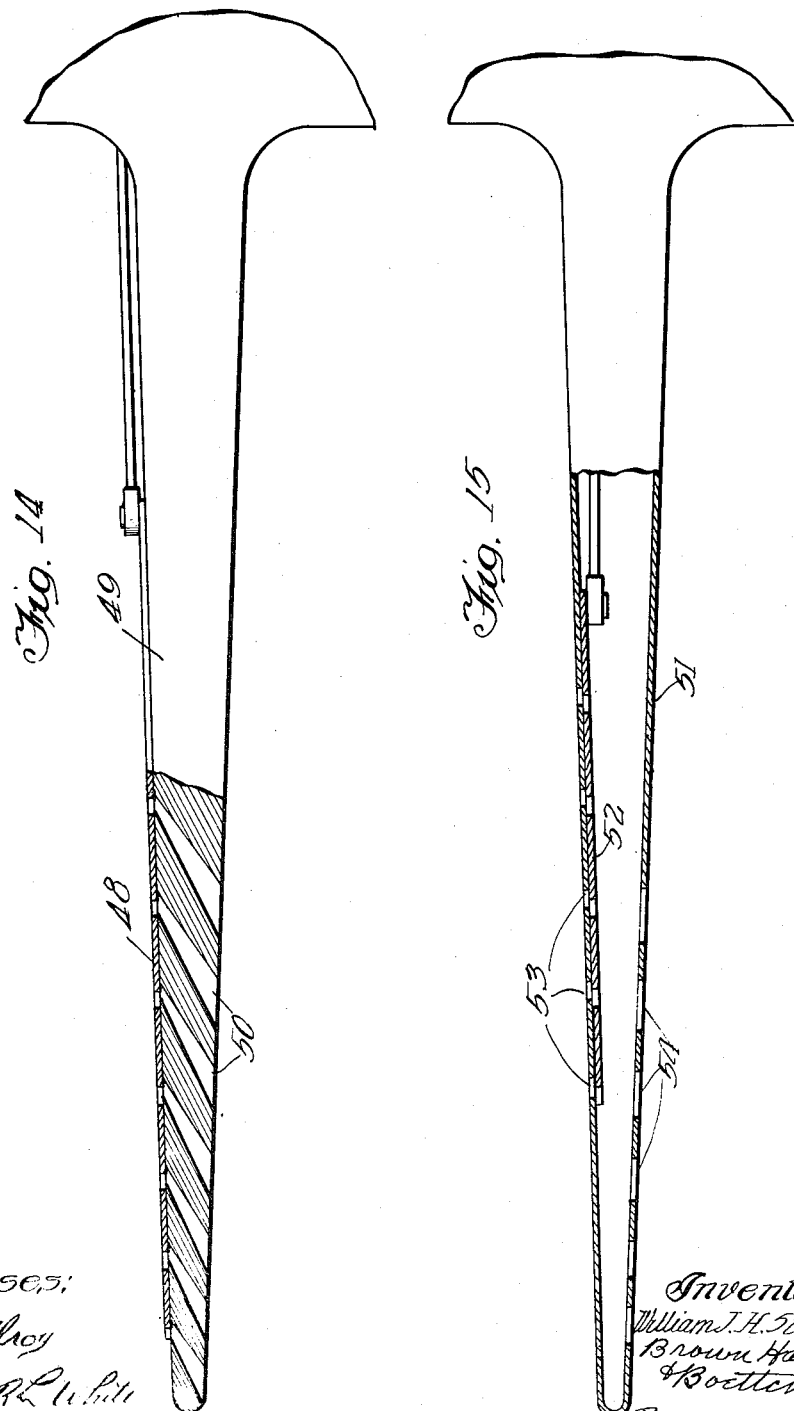

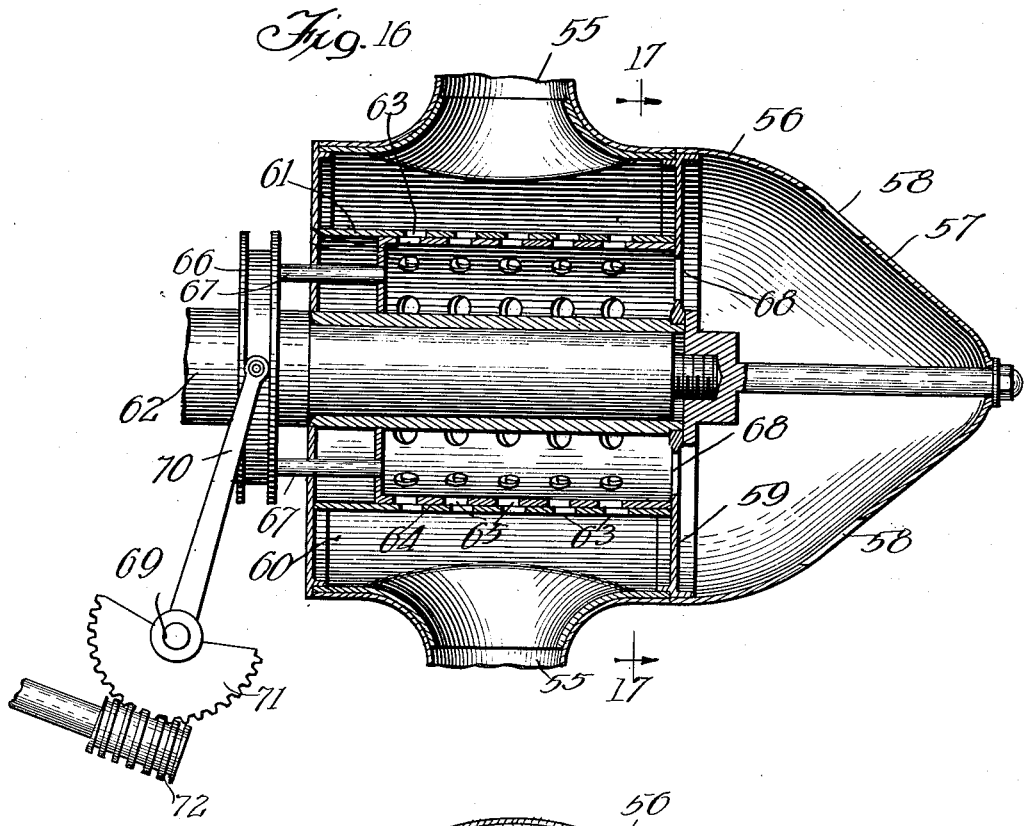
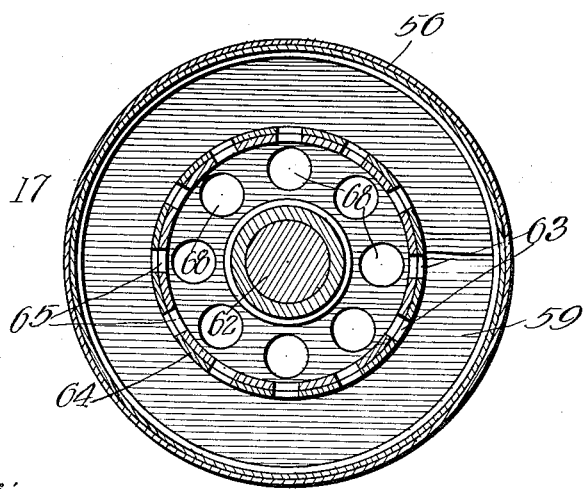

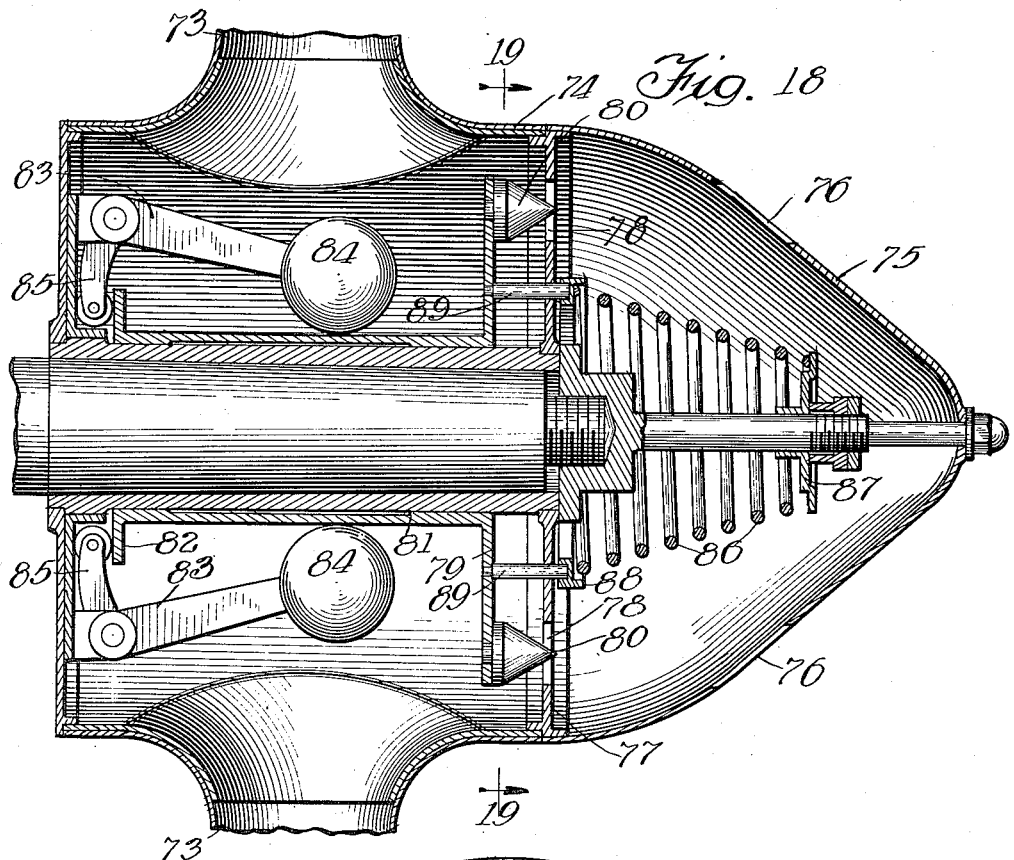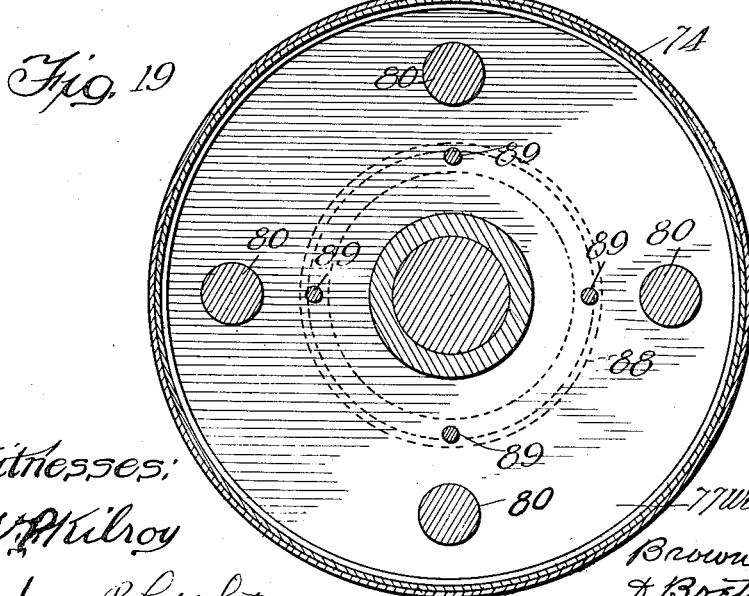

July 15, 1924.
W. J. H. STRONG
METHOD OF CONTROLLING PROPELLERS
Filed July 15, 1918  16 Sheets-Sheet 8
1,501,248
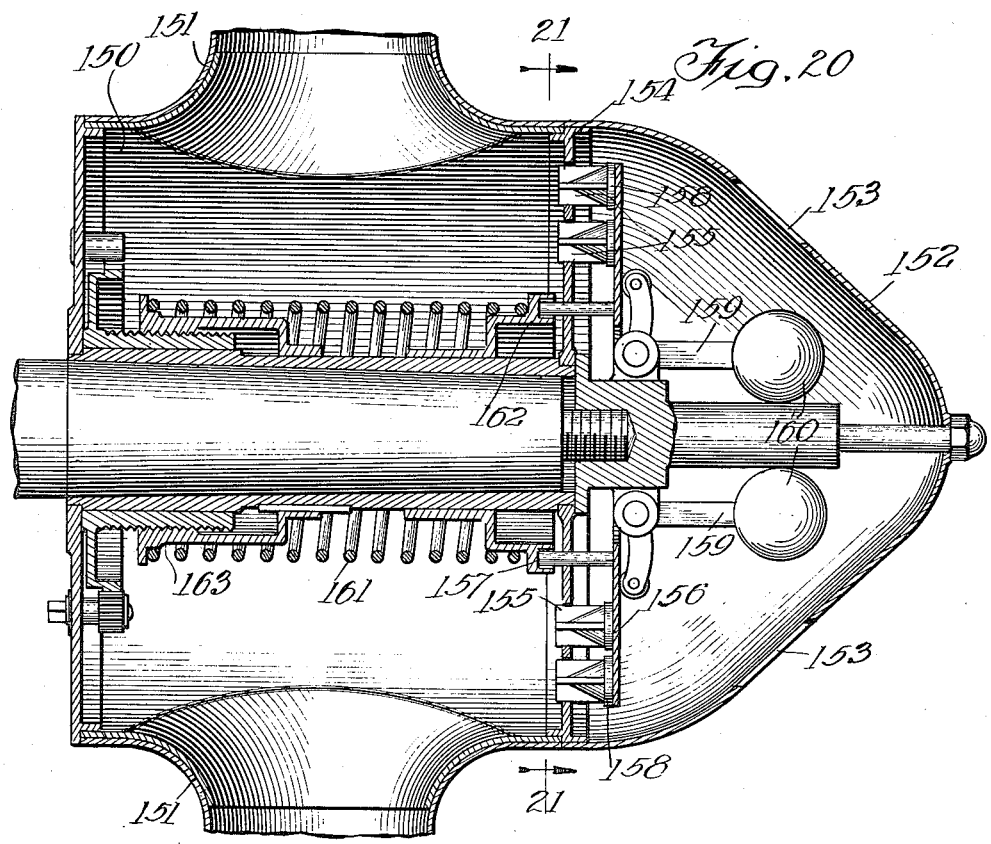
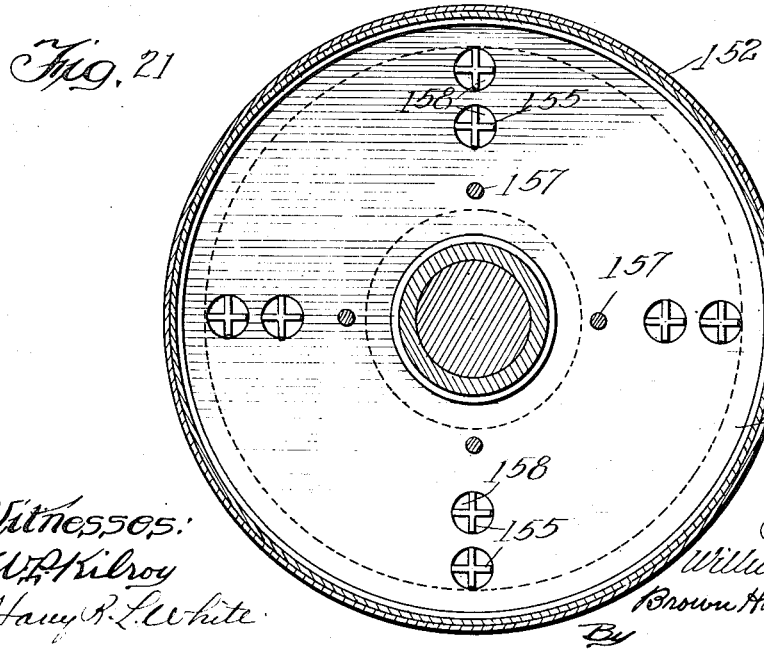

July 15, 1924.
W. J. H. STRONG
METHOD OF CONTROLLING PROPELLERS
Filed July 15, 1918    16 Sheets-Sheet 9
1,501,248
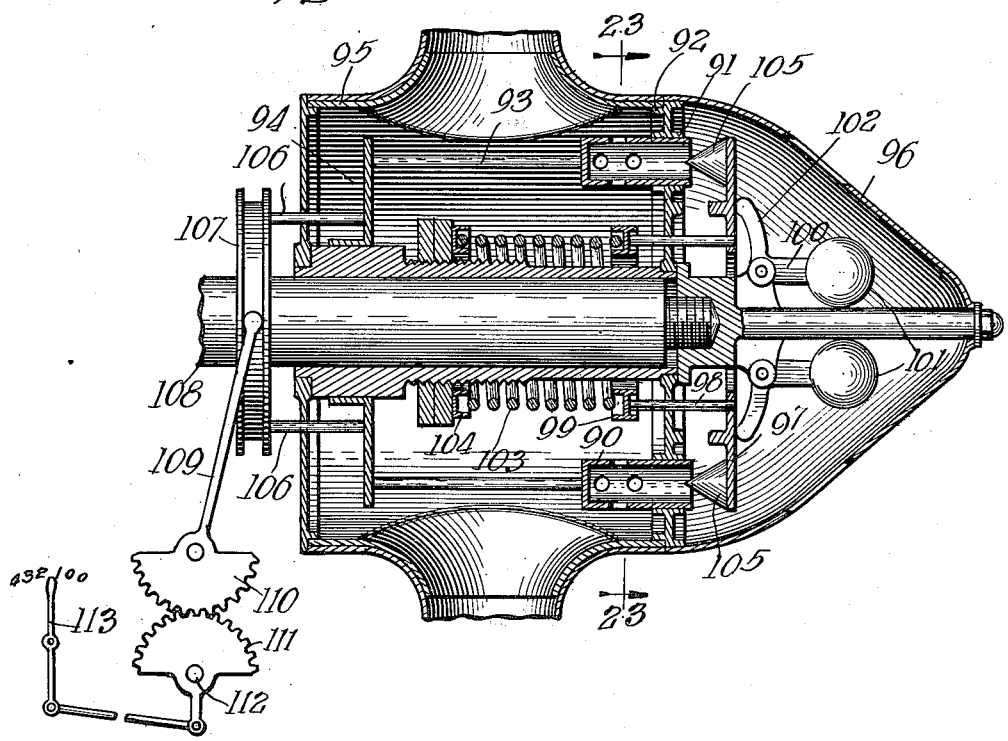
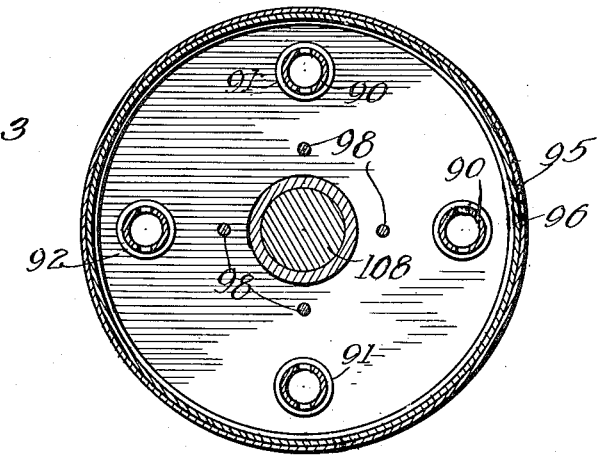
Witnesses:
W. Kilroy
Harry R. L. White
Inventor:
William J. H. Strong
By Brown Hanson & Boettcher
Attys.

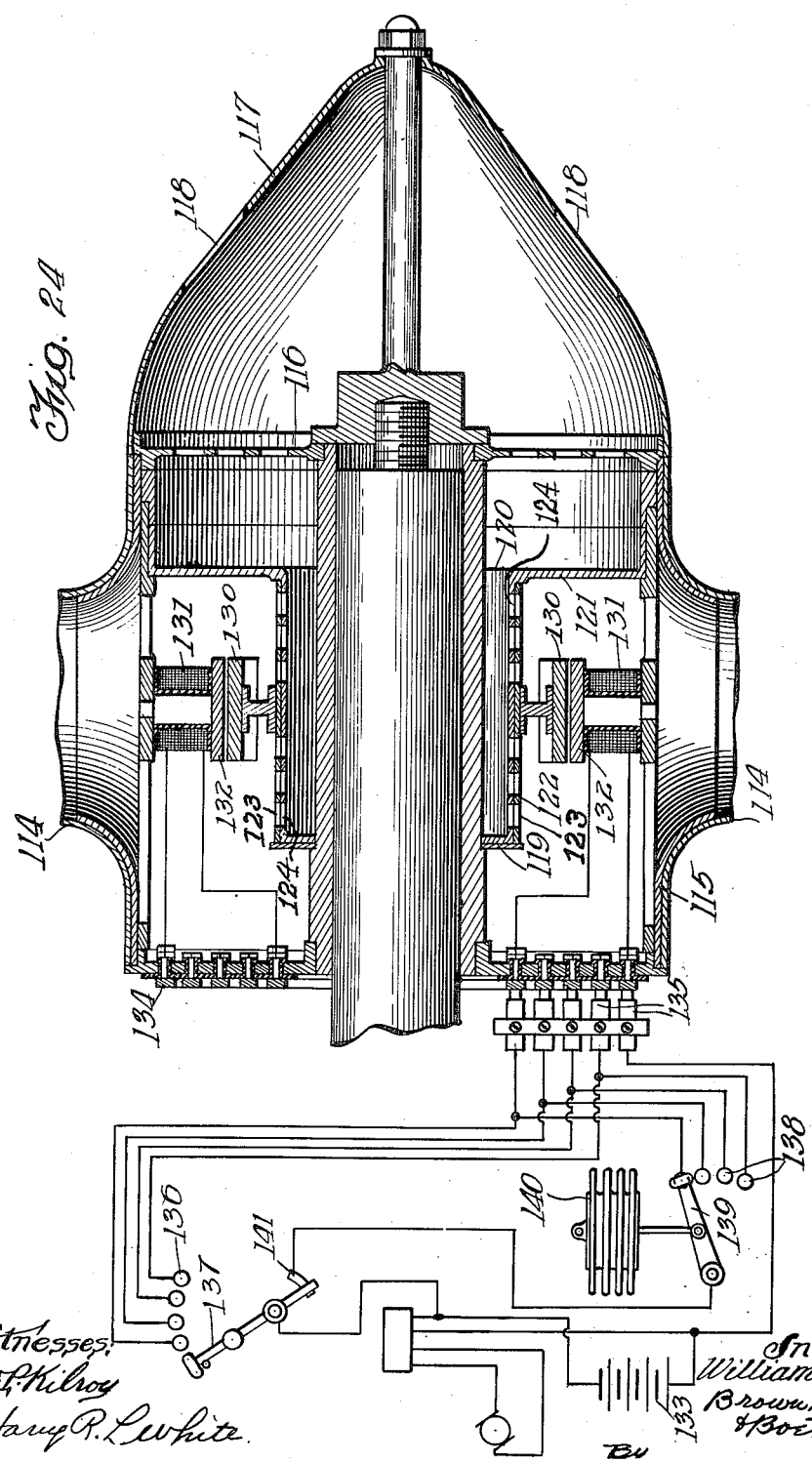

July 15, 1924.

W. J. H. STRONG

METHOD OF CONTROLLING PROPELLERS

Filed July 15, 1918     16 Sheets-Sheet 11

1,501,248

Witnesses:
W. L. Kilroy
Harry R. L. White

Inventor:
William J. H. Strong
By Brown Hanson & Boettcher
Attys

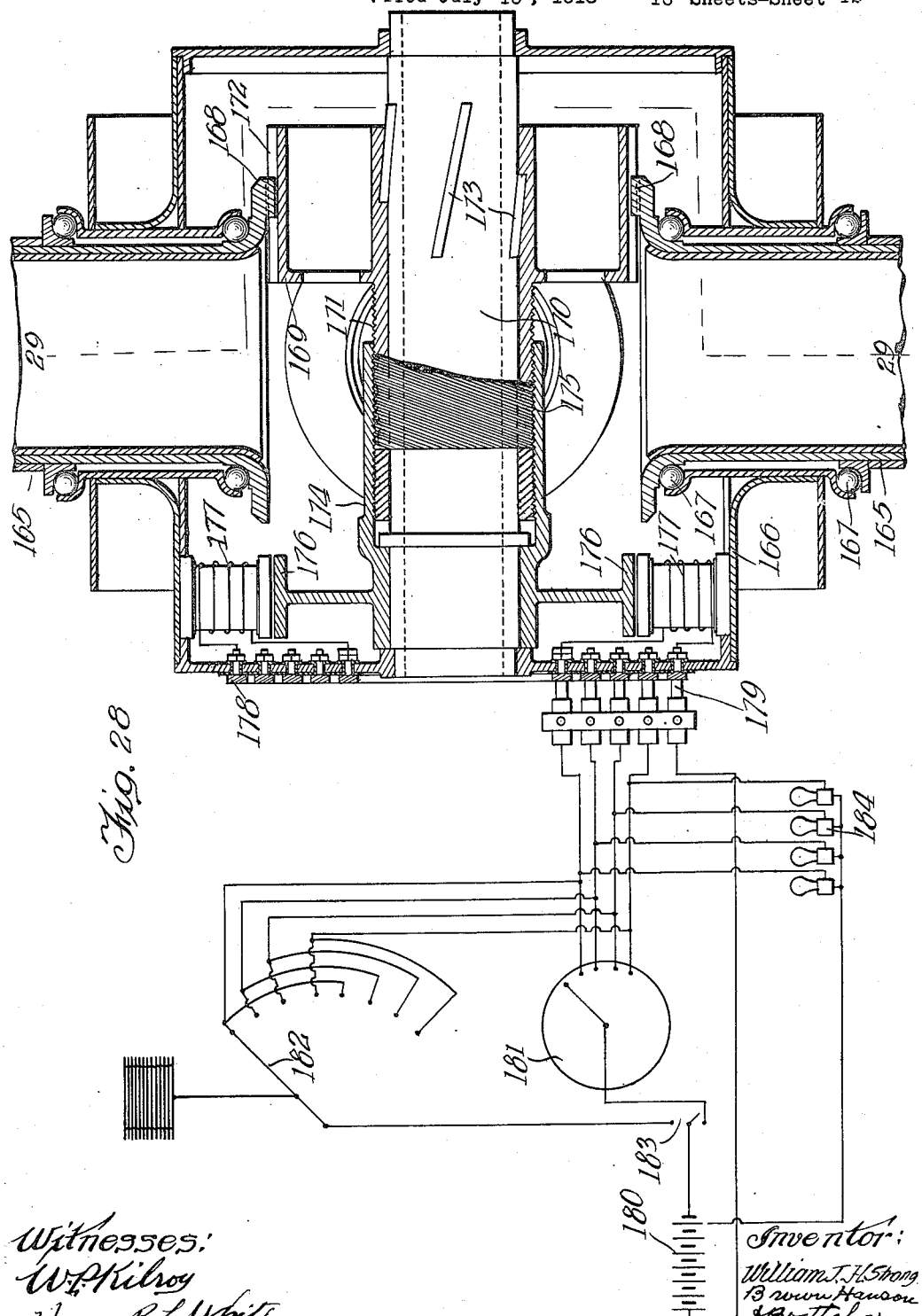

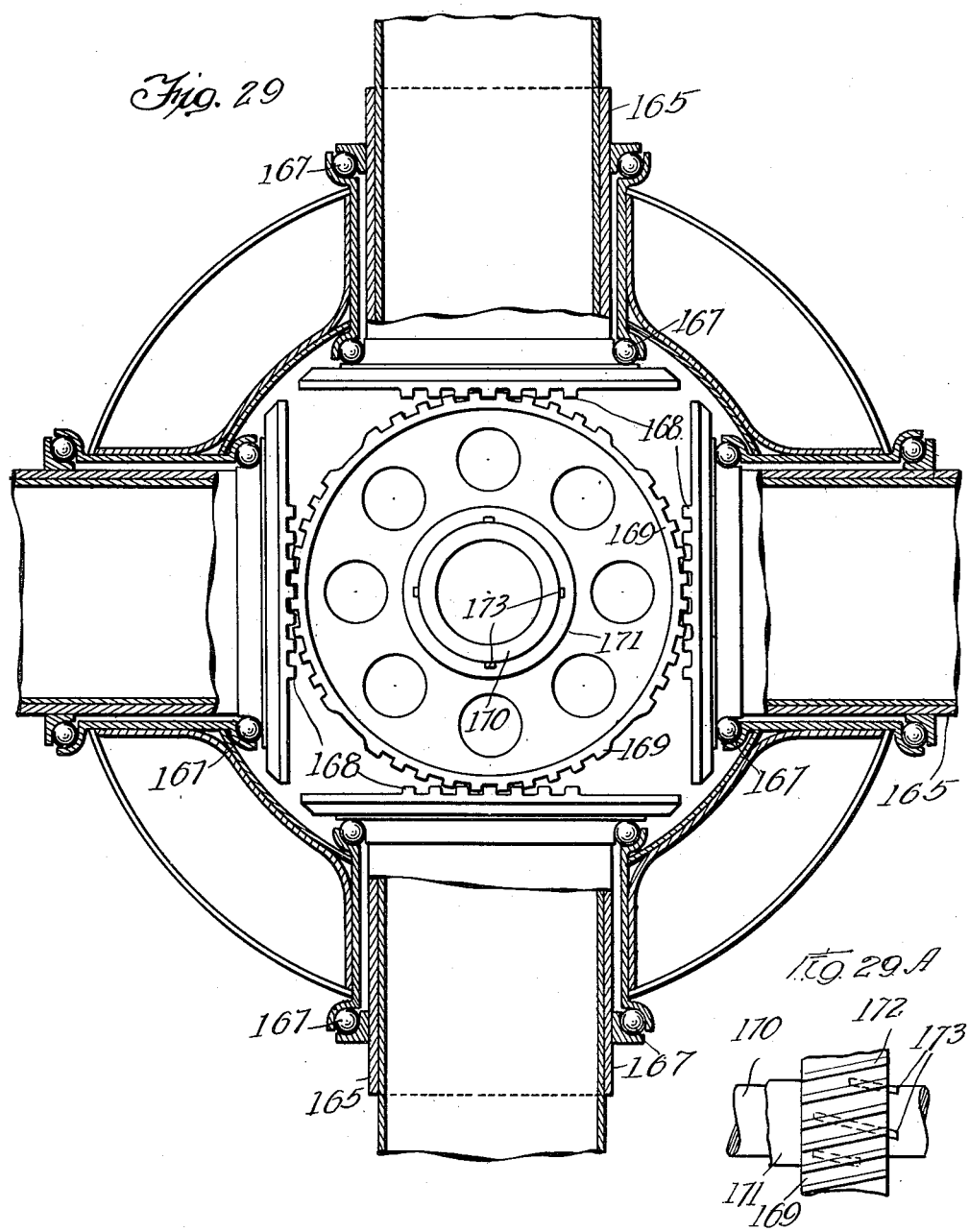

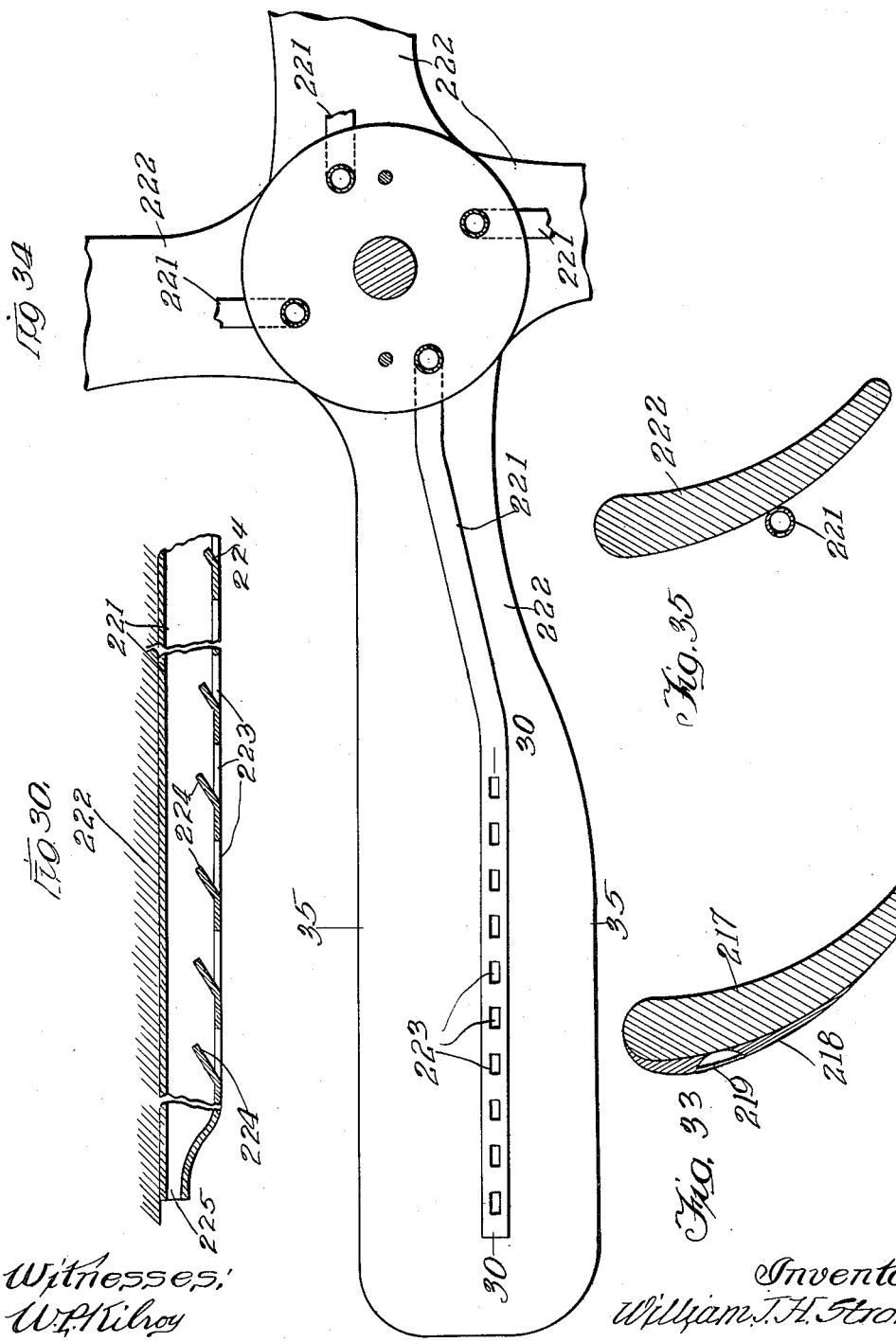

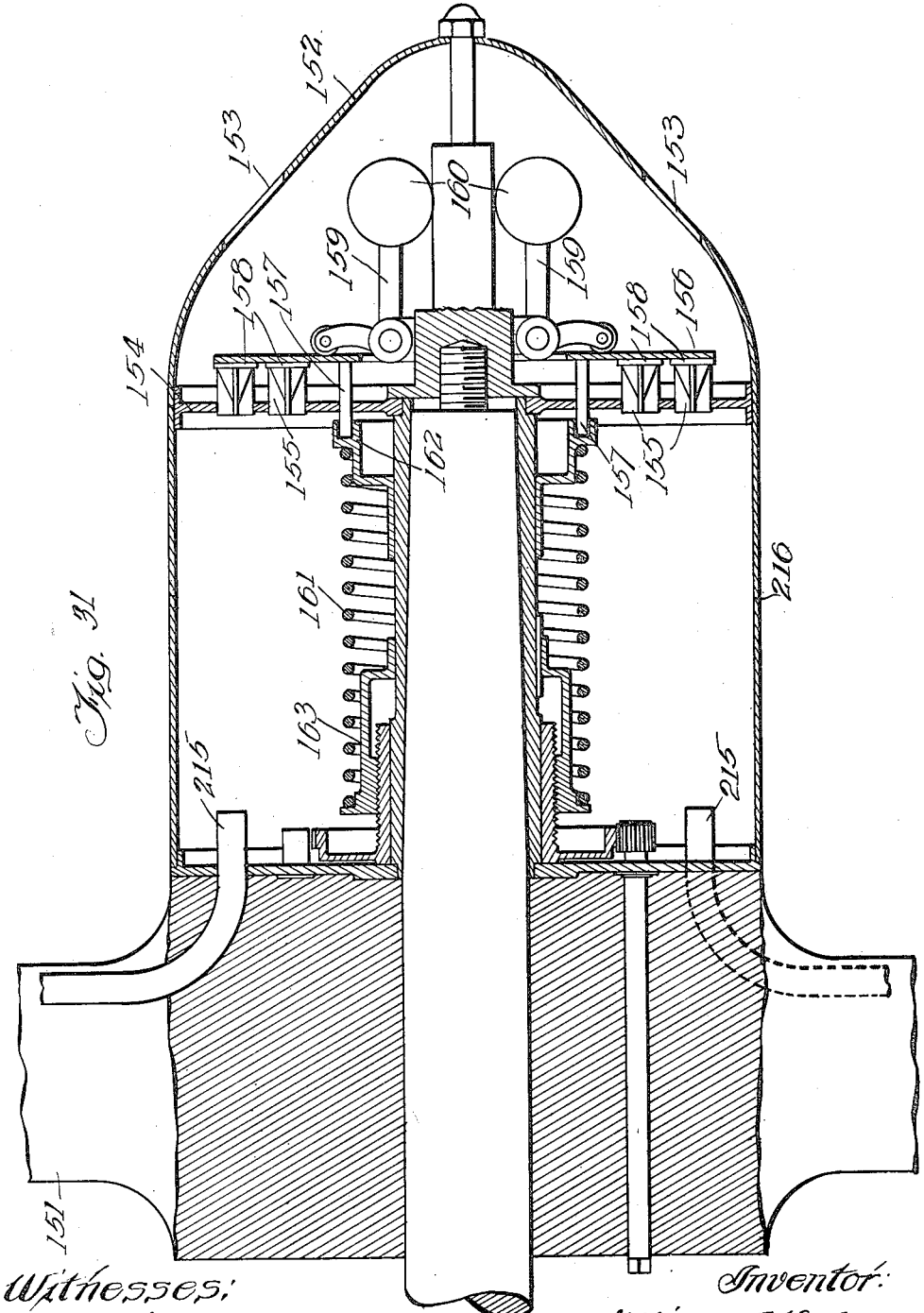

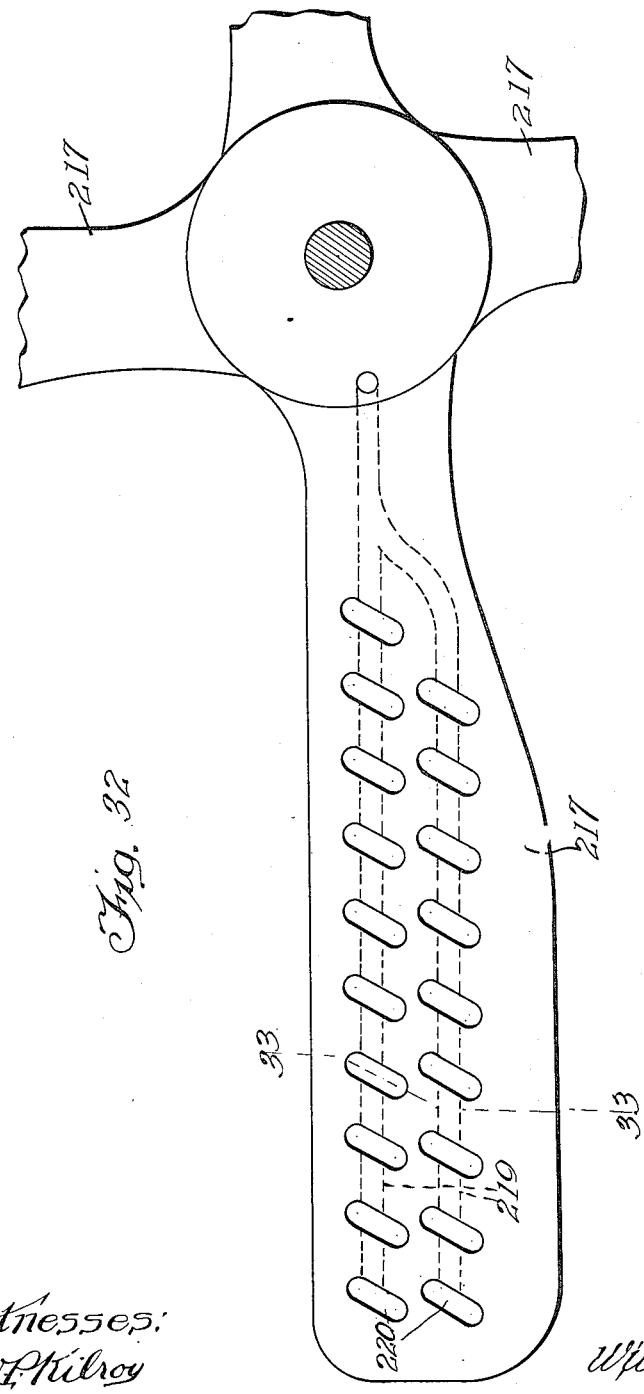

Patented July 15, 1924.

1,501,248

UNITED STATES PATENT OFFICE.

WILLIAM J. H. STRONG, OF CHICAGO, ILLINOIS.

METHOD OF CONTROLLING PROPELLERS.

Application filed July 15, 1918. Serial No. 244,911.

*To all whom it may concern:*

Be it known that I, WILLIAM J. H. STRONG, a citizen of the United States, a resident of Chicago, county of Cook, and State of Illinois, have invented a certain new, useful, and Improved Method of Controlling Propellers, of which the following is a specification.

My invention relates to propeller wheels and has special reference to propellers for use on flying machines or airplanes, and helicopters.

The object of my invention is to provide a method of governing or controlling the work done by airplane propellers and therefore their power absorption, so as to permit the maximum application of power by the engine and consequent maximum propelling or tractive effect at all altitudes.

In other words, it is my object to provide a method of propeller control which shall, in effect, reduce the proportional absorption of power at lower levels and likewise increase the proportional absorption of power at higher levels so that the maximum engine effort may be best made use of for propelling the airplane at the highest possible speed at all levels.

My invention resides in a method of governing or controlling propellers whereby the airplane propelling effort of the propeller is affected by controlling the vacuum at the back of the propeller blades.

It is obvious that the vacuum can be controlled in many different ways and by varying means, but whether a change of pitch is combined with the change in the vacuum or not, the fundamental element is the changing or controlling of the vacuum at the back of the blade, which in turn controls the power absorption of the blade, and the work done thereby and affects the speed under certain conditions and permits the power unit or engine to be operated at maximum effective effort at all levels, which results in a possible maximum airplane speed at all levels.

In the accompanying drawings forming part of this specification, I have illustrated a number of ways, both manual and automatic, in which this control of the vacuum at the back of the blade can be effected, and I have illustrated combined manual and automatic means and also automatic means controlled by speed or the rotation of the propeller, other automatic means controlled by the air or barometric pressure and various combinations of these means for the purpose of indicating the great flexibility of my system of control to meet the most varied and exacting requirements.

In said drawings:

Figure 1 is a fragmentary sectional view of a propeller, showing one means of practicing my method and taken substantially on the line 1—1 of Figure 2;

Figure 2 is a similar section, taken on the line 2—2 of Figure 1;

Figure 3 is an enlarged fragmentary section taken on the line 3—3 of Figure 1;

Figure 25:
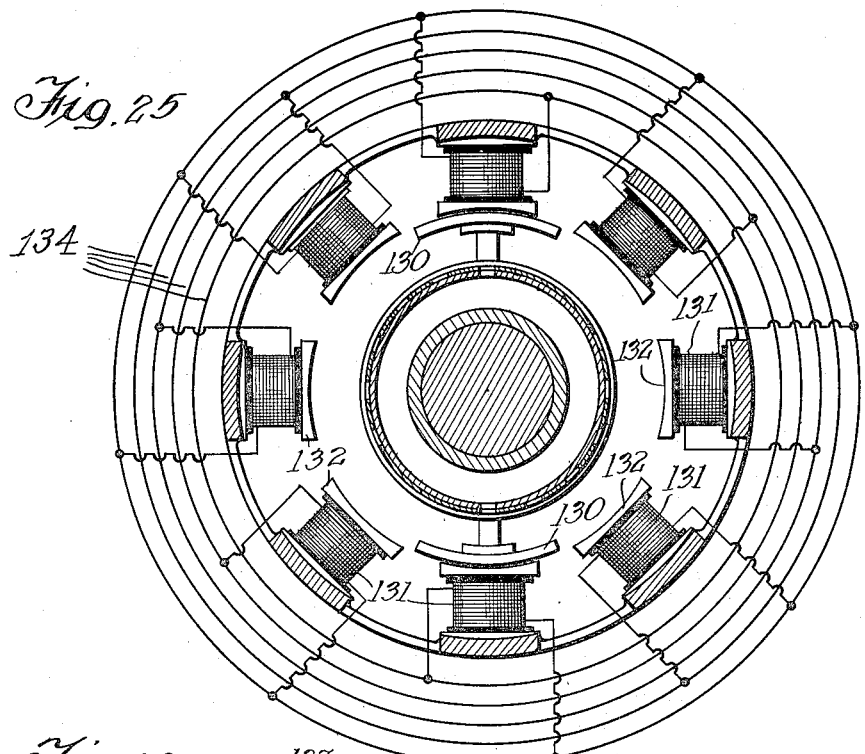
Figure 26:
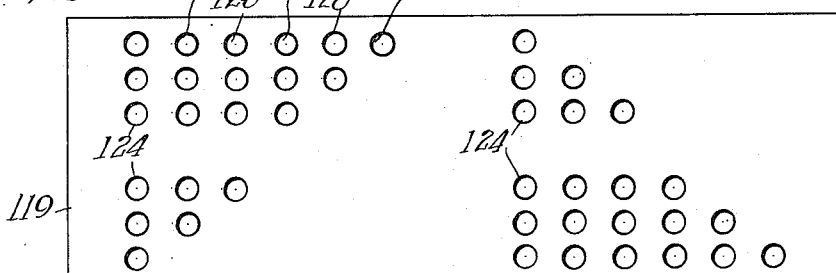
Figure 27:
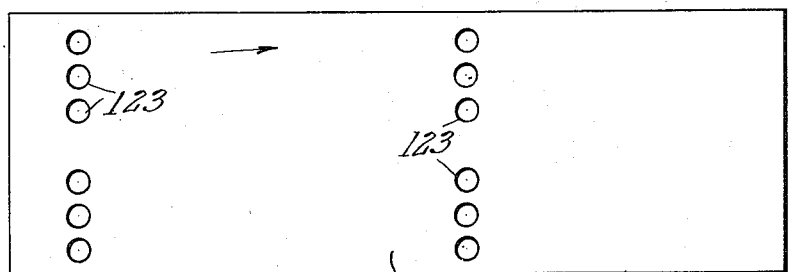

Figures 4, 5, 6, 7 and 8 are cross sectional views of the blade on the lines 4—4, 5—5, 6—6, 7—7 and 8—8, respectively, of Figure 1;

Figure 9 is a view similar to Figure 1, illustrating a method of obtaining air from the hub for breaking or controlling the vacuum;

Figure 10 is a sectional view taken on the line 10—10 of Figure 9;

Figure 11 is a fragmentary view of the propeller illustrating the application of my method to a solid blade propeller;

Figures 12 and 13 are sectional views of the propeller blade taken on the line 12—12 and 13—13, respectively, of Figure 11;

Figure 14 is a fragmentary sectional view of a solid propeller illustrating another means of effecting the efficient control of the vacuum;

Figure 15 is a similar view of a hollow blade showing the application thereto of the same method of control;

Figure 16 is a fragmentary sectional view of a hollow propeller hub, showing a means for manually controlling the flow of air through the hollow blades;

Figure 17 is a cross sectional view of the propeller hub on the line 17—17 of Figure 16;

Figure 18 is a view similar to Figure 16 showing automatic speed regulating means for controlling the flow of air from the hub to the hollow arms;

Figure 19 is a cross sectional view on the line 19—19 of Figure 18;

Figure 20 is a view similar to Figure 18 showing a modified form of the automatic speed regulation means for controlling the flow of air from the hub to the hollow blades;

Figure 21 is a cross sectional view on the line 21—21 of Figure 20;

Figure 22 is a view similar to Figure 20, showing a combined automatic speed regulated means and a manual control;

Figure 23 is a cross sectional view on the line 23—23 of Figure 22;

Figure 24 is a fragmentary longitudinal sectional view of a propeller hub and a diagrammatic view of electric circuit and devices showing means for manually and automatically controlling the flow of air from the hub to the hollow arms, electricity being the medium for effecting the control;

Figure 25 is a diagrammatic sectional view of the propeller hub shown in Figure 24 and illustrating more clearly the method of controlling the flow of air from the hub to the hollow arms;

Figures 26 and 27 are developed views of the cylindrical valve shown in Figure 24;

Figure 28 is a fragmentary longitudinal sectional view of a propeller hub and a diagrammatic view of electric circuits and devices, particularly illustrating means for manually or automatically rotating the several propeller arms on their radial axes and thereby effecting the vacuum at the backs of the blades in relation to the speed of the airplanes;

Figure 29 is a fragmentary cross-sectional view of the hub shown in Figure 28 on the line 29—29 of Figure 28;

Figure 30 is a fragmentary longitudinal sectional view of the blade on the line 30—30 of Figure 34;

Figure 31 is a view similar to Figure 20, but showing the automatic speed regulated control applied to a solid bladed propeller;

Figure 32 is a fragmentary elevation of a solid bladed propeller showing one manner of forming the blade to permit the escape of air at the back thereof;

Figure 33 is a cross sectional view on the line 33—33 of Figure 32;

Figure 34 is a view similar to Figure 33, showing another method of permitting the escape of air from the back of the blade;

Figure 35 is a cross sectional view on the line 35—35 of Figure 34.

In order that an understanding of my improvement may be best attained, I will first describe in detail the form of propeller illustrated in Figures 1 to 8 inclusive.

In said figures, 1 is the shaft upon which the propeller is mounted and to which it is secured for rotation therewith; it may be the motor shaft or run by the motor shaft. Usually the propeller is mounted directly on the motor shaft or an extension thereof.

I have illustrated the propeller which I designate generally by 2 with four propeller arms or blades 3 which extend radially out from the hub 4. The blades and the hub, in the form shown, are formed of relatively thin sheet metal and are hollow. The blades merge into each other and into the hub 4 with easy curves, and to strengthen the blades I connect them together adjacent to their inner ends by a ring 5 which surrounds the hub 4 and braces the blades in an obvious manner.

To mount the propeller on the shaft I provide a sleeve 6 secured to the shaft and upon which I mount an inner hub member 7 provided at one end with a plate 8 and at the opposite end with a similar plate 9. The inner hub member 7 fits closely within the hub 4 and has nozzle-like portions 10 which enter the inner ends of the blades. The blades, as explained, and as shown are hollow from tip to base. They are curved inwardly or concave on their front or forward faces 11, viz, the forward faces as related to the direction of rotation and curved outwardly or convex on their opposite faces or backs 12.

It is well known that if the propeller and engine are proportioned so as to develop the maximum of engine power at substantially sea level, the engine will run too fast at higher levels if the same engine power is maintained, where the air is more rarefied and in which non-rarefied medium the propeller runs more easily.

This undesirable feature of aeronautics has developed the demand for a propeller which would increase its effective power consumption at the higher levels and still maintain its efficiency. To meet this demand it has been found that a propeller which in effect increases the pitch or angular displacement, its area or surface of blade and its diameter or length of blade could be made to require practically a uniform power at all levels and would develop maximum speed of plane for all levels considering the possible or desirable motor speed.

I provide a hole extending through the blade preferably substantially parallel with the axis of the wheel and I thereby reduce the effective area of the blade, the part of the blade thus removed or opened up may be as much as one-third of the total area.

It is very easily understood that when the blade is thus reduced in effective area, the practical result will be similar to what would take place if the diameter were reduced.

It is also well understood that a more or less perfect vacuum is produced back of the blade, when in action, and by means of my improvement I not only change in effect the elements of the propeller as explained, but I also control the vacuum at the back of the blade, or looked at in the opposite way I make use of the vacuum to assist in pulling the air through the opening in the blade and thus make the opening effective to accomplish the result desired.

While many ways might be devised to effect the control of the vacuum at the back of the blade, I prefer to provide the blade with a relatively large perforated area 13 on its face. Preferably I make the perforations or holes 14 relatively small, arranging them in several parallel rows 15 running longitudinally of the blade, and I provide a plate 16 within the blade and arranged to contact with the inner surface of the front wall of the blade. This front wall 11 of the blade is more or less of a warped surface, as shown, that is, it changes its shape from point to point, and in order that the plate 16 may conform to and with said inner surface and lie snugly against same, I divide it into several narrow strips or bars 17, one for each row 15 of the holes 14. These strips or bars are likewise each provided with the holes 18 adapted when placed at the inner limit of its movement to register with the holes 14, and when moved to the outer limit of its movement to lie between the holes 14, the bars at such times effectually closing the holes 14.

For operating the bars 16 I connect them together at their inner ends by the crossbar 19 which I connect by a rod 20 to a ring 21 mounted for rotary movement around the shaft 1. The ring 21 is mounted on antifriction ball bearings 22 and I provide it with four arms 23 to which the several rods 20 are pivotally connected at their inner ends. Each rod 20 is pivotally connected at its outer end to the crossbar 19 of its respective valve plate.

To resist the centrifugal pull of the plates 16 I provide a second ring 24 also mounted for rotation around the shaft 1 on the sleeve 6, and I hold it stationary by means of locking pinions 25 which mesh with a gear 26 formed integral with the ring 24.

These pinions are mounted on the inner ends of short shafts 27 carried in suitable bearings on the plate 9. On the outer ends of the shafts 27 I provide ratchet wheels 28 engaged by holding dogs 29 and I square the outer ends 29' of the shafts 27 so that I can adjust the relative angular position of the ring 24 in an obvious manner. I provide the ring 24 and the ring 21 with co-operating projections 31 and 30 respectively adapted to receive and hold the opposite ends of the tension springs 32 which serve to properly hold the valve plates 16 at the inner limit of their movement. The plates 16 are limited in their movement by the posts 33 which are rigidly mounted in the front wall of the blade and project through the slots 34 in the plates.

In Figures 1 and 2 the plates 16 are shown in mid-position. The plates 16 are held in contact with the wall of the blade and guided in their movement by guide pins 35 rigidly mounted in the front wall of the blade and blocks or plates 36 rigidly mounted on the inner ends of the pins and overlapping the edges of the strips or bars 16.

The strip or divided form of plate permits the plate to conform to the inner surface of the front wall of the blade without undue friction.

I arrange the plates 16 and the tension springs 32 so that the wheel must revolve at the predetermined number of revolutions per minute before the plate 16 begins to move outwardly to close the openings 14; that is I adjust the ring 26 and tension the springs 32 sufficiently to hold the plates at their inner positions with sufficient force to overcome the centrifugal force of the plates until the wheel revolves at the predetermined speed, which may be a thousand revolutions a minute.

To permit the escape of the air from the blade and to reduce the vacuum at the back of the blade I provide outlet openings 37 in the rear wall of the blade preferably in aggregate of greater area than the combined area of all of the openings 14 in the front wall of the blade, so that the air can leave the blade freely and not form a pressure therein.

It should be understood that the front wall of the blade is so thin that even when the openings 14 are closed they do not form pockets deep enough to materially affect the surface action of the blade.

Besides the openings 37 which I distribute over the back of the blade, I sometimes also provide an opening 38 in the tip of the blade through which the air is thrown from the blade by centrifugal action, as well as by any slight pressure which may be produced in the blade by the air entering through the holes 14.

In airplanes of the kind to which my improved method of propeller control is specially adapted to be applied, it is desired that the maximum power production and speed of airplanes be developed at a relatively high altitude, substantially ten thousand feet.

When the ordinary solid blade is used on the engine and is proportioned in power drive at best propelling speed at sea level, the engine will be capable of driving the same blade at greatly accelerated speed at elevated positions.

By means of my improved method of control I am enabled to eliminate these difficulties because I provide means whereby the wheel is in effect easier to drive at the lower levels and harder to drive at the higher levels, and I make the adjustment between the two, automatic in relation to the speed of the engine, or rather of the wheel. It is well understood in mechanics that the tension springs can be so arranged and adjusted that a variation of 100 revolutions in the motor shaft can effect the opening and closing of the holes 14 and thus change the wheel from maximum to minimum within this relatively small variation of speed.

Under some conditions I have found it advantageous to provide an outlet opening 38 at the outer end or tip of each blade. This opening and the outermost of the openings 37 in the back of the blade permit the air to escape from the hollow blade and assist to make effective the openings 14 when they are opened. These outlet openings at the outer ends of the blades serve another, and what I consider more useful, purpose, they permit the centrifugal force of the air within the blade to cause such a rapid or forcible discharge of the air, especially at high speeds, that I am enabled to produce more or less of a vacuum within the blade. This vacuum will cause the air to be drawn through the holes 14 when they are opened, and at all times will assist in decreasing the pressure at the rear face of the blade drawing the air through the openings 37.

In the form shown in Figures 1 to 8 inclusive, the valve plates are shown on the front wall of the blade, the blade being provided with three openings in their rear walls, through which the air admitted to the front wall can escape and affect the vacuum at the back of the blade.

In Figures 9 and 10 I have shown a form which has a smooth imperforate forward surface on the blade, the valve plate 40 in this connection being arranged to control the openings 41 in the rear wall of the blade, and thus control or affect the vacuum at the back of the blade.

The mechanism for controlling the position of the valve plate in this instance is the same as that already described in reference to Figures 1 to 8. In this instance, however, I provide openings 42 in the forward end of the hub housing for the admission of the air and I control the egress of the air through the back of the blade by the valve plate 40.

In Figures 11, 12 and 13 I have illustrated the method of control as it would be applied to a propeller having a solid blade. Here the valve plate 44 is slidable on the outer surface of the blade 45. This valve plate can be operated by any suitable mechanism such as that already described in relation to Figures 1 to 8.

This plate is provided with holes 46 which are adapted at times to register with holes 47 in the blade and permit air to pass directly thru the blade from the front to the back, thus not only lessening or destroying the vacuum, but also reducing the effective area of the blade.

It should be understood that the illustration of the application of the valve plate to the solid propeller is typical merely as the proportion of area of holes to the area of the blade can be varied to suit any condition.

In Figure 14 I have shown another application of the plate to the solid propeller and have combined with the idea of perforating the blades, the idea of obtaining some benefit of the centrifugal force developed by the revolution of the propeller in causing the air to be forcibly drawn through the openings. In this instance the plate 48 is on the forward face of the blade 49 and the holes 50, through the blade, which are controlled by the plate, are inclined outwardly and are tapered larger toward their rear ends. Both the tapering of the holes and their outward inclination assists in the forcible drawing of the air through the blade from the front to the rear and in consequence controls the vacuum at the back of the blade.

In Figure 15 I have illustrated this same idea applied to the hollow blade construction. In this case the hollow blade 51 carries the valve plate 52 upon the inner surface of its front wall, which is provided with a series of holes 53 adapted to be controlled by the plate in the manner described in relation to Figures 1 to 8. These holes 53 do not extend to the outer end of the blade, but terminate some distance therefrom. On the other hand the outlet holes 54 at the back of the blade extend nearly to the tip of the blade and are arranged to best break or control the vacuum and obtain the benefit of the pressure developed within the blade due to its high rotative velocity.

In Figures 16 to 23 inclusive, I have illustrated several ways in which the flow of air to the hollow blade of the propellers can be controlled at the hub of the propeller instead of directly on the blade itself.

In Figures 16 and 17 I have illustrated a manual means for so controlling the air. In this instance 55 represents the inner hollow ends of the blades, which are not shown, but are provided with the control openings on their rear surfaces for admitting air to control or regulate the vacuum at the back of the blades.

The blades are mounted upon and extend from a hollow hub 56 having a forward projecting and tapered housing 57 provided with air inlet holes 58.

Within the hub casing and separated from the forward end by a partition 59, is a central chamber 60 in communication with the several hollow arms.

To control the flow of air through the hub to the arms I provide a cylindrical shell 61 concentric with the propeller shaft 62 and extending from the rear end of the hub to the division wall 59. This wall is provided with a number of longitudinal rows of holes 63. Within the cylinder I provide a valve cylinder 64 nicely fitting within the cylinder and held concentric with the sides by an end flange 65.

This valve cylinder has openings 66 adapted to register with the openings 63 and permit air to pass to the chamber 60. To regulate the position of the cylinder valve 64 I provide a grooved ring 66 outside the hub and mounted to slide on the shaft 62. This ring is rigidly connected to the valve cylinder 63 by rods 67 which pass through the inner end of the hub. The forward end of the space within the valve cylinder is connected by openings 68 with the forward end of the hub so that air passes freely through the hub within the valve cylinder.

To move the valve cylinder for regulating the quantity of air which I wish to flow to the arms I provide an arm pivotally mounted at 69 on some fixed part of the machine and having ends 70 engaging in the grooved ring 66. I provide the arm with a crescent worm wheel 71 engaged by a worm 72 which may be rotated by hand or by any other suitable means and thus adjust the valve cylinder within the hub to let more or less air out through the hollow arms.

In Figures 18 and 19 I have illustrated a very simple means for automatically controlling the flow of air through the hollow hub to the hollow arms.

In this form the arms 73 are mounted upon the hollow hub 74 which is provided as before with a tapered forward projecting casing 75 having inlet openings 76. The hub proper is divided from the forward end by a partition 77 provided with several air openings 78. Any air which passes through these openings is free to flow out through the hollow arms. Normally these holes are open. To automatically close these openings on a rise in the rotative speed of the propeller above a certain predetermined number of revolutions per minute I provide a plate 79 in the hub carrying tapered valves 80 adapted to be projected into the holes 78 to close them more or less. The plate is carried by a sleeve 81 mounted to slide within the hub and provided with a rear, outwardly projecting flange 82. I mount a pair of bell cranks 83 on the rear end of the hub having balls 84 on one end and their other ends 85 being adapted to bear upon the flange 82 and so arranged that as the balls 84 move outwardly under the rotative effect of the propeller the sleeve 81 will be pushed forward and the valves 80 will control the openings 78. To control the movement of the balls and not let them swing out too quickly, I provide a coiled spring 86 within the forward end of the hub which bears at its outer end against an adjustable washer 87 mounted on an extension of the propeller shaft and at its rear end upon a ring 88 which is carried on the outer ends of pins or posts 89, rigidly carried by the valve plate or disk 79, so that any movement of the balls 84 is counteracted by the spring 86. It will be understood that the spring 86 can be adjusted to prevent any movement of the balls until the propeller has reached a predetermined speed; for instance, 1000 revolutions per minute.

As explained hereinbefore, the air holes between the front of the hub and the hollow arms are normally open. This is for the purpose of reducing the power necessary to rotate the propeller at a certain speed, depending upon the engine used and as the speed increases, on account of the decreased resistance of the air at higher levels, the holes are closed, thus in effect increasing the work done by the propeller and in consequence the work done by the engine, and thus holding the engine against too high speed.

At times when the holes are closed it might, under certain conditions, be desirable to open them again, or if they were partly closed it might be an advantage to close them entirely. To accomplish this result I have illustrated a manual operable means in Figure 22.

In this case I mount valve tubes 90 in the openings 91 in the partition 92. These tubes are carried on the forward ends of rods 93 mounted in a plate 94, slidable within the hub 95. Within the forward end 96 of the hub I mount a plate 97 on rods 98 projecting through the partition 92 and abutting against the ring 99. In the forward end of the hub I also mount a pair of bell crank levers 100, having balls 101 on one end and the shorter ends 102 engage the plate 97. The outward movement of the balls is opposed by a spring 103 mounted between the ring 99 and an adjustable ring 104 carried by the shaft of the propeller. The plate 97 carries conical plugs 105 adapted to be projected into the open ends of the valve tubes 90.

The flange 94 is connected by rods 106 to a sliding grooved ring 107 mounted on the propeller shaft 108 outside the hub and arranged to be engaged by the end of a pivotally mounted lever 109 which is provided at its other ends with a segmented gear 110 adapted to mesh with a similar gear 111 mounted at 112. The gear 112 is adapted to be rotated by a hand lever 113 in an obvious manner. The operator, by means of the lever 113, can close the tubes 90 against the valves 105, no matter what relative position they may be in at the time and can then draw them away from the valve to any extent he may desire to accomplish the necessary purpose.

In Figure 24 I have shown a means for electrically controlling the flow of air from the hub to the hollow arms. In this form the hollow arms 114 are carried by the hollow hub 115. The perforated wall 116 divides the hub proper from the forward tapered housing 117. This housing has air inlet openings 118. I arrange a fixed cylinder 119 within the hub proper, having an open end 120 through which air can pass to the interior thereof, after passing the perforated wall 116. I arrange a solid wall or partition 121 closing the hub to the entrance of air except through the cylinder 119. Upon the outer surface of the cylinder 119 I mount for rotation a cylindrical shell 122 and I arrange two longitudinal rows of holes 123 in the outer cylinder and a graduated series of rows of holes 124 to 129 inclusive in the inner or fixed cylinder, ranging from a number of holes equal to the number in the rows in the outer cylinder down to one hole each.

Normally the two cylinders are in such relative position that the holes in the outer cylinder register with the row of holes 124 in the inner cylinder having the same number of holes. It will now be plain that if the outer cylinder is rotated upon the inner cylinder in the direction of the arrow on Figure 27, the openings through which air can escape to the hollow arms will gradually decrease one hole at a step until no air can pass.

To cause the outer cylinder to rotate I provide diametrically opposed iron shoes or armatures 130 mounted rigidly on the outer cylinder and I provide a ring of electromagnets 131 within the hub and surrounding the outer cylinder and having inner heads 132 adapted to lie just outside the path of the said armatures 130.

I make the armatures 130 relatively long circumferentially so that when they are arranged as shown in Figure 25 and the magnets opposed to the armatures are energized and also the ones next in sequence in the direction in which it is desired to move the cylinder 122 are energized, the armatures are drawn around to a mid-position between the two magnets, then by energizing only the second magnets the armatures with the cylinder 122 will be rotated to a position where the armatures are positioned centrally with relation to the second magnets and so on for a half revolution, when the openings will all be closed and no air can flow.

To effect this successive energizing of the magnets I provide a source of electricity 133, see Figure 24, and I provide a series of concentric contact rings 134 on the inner end of the propeller hub. I provide stationary carbon contacts 135 for making connection with the rings and the several rings are suitably connected to the several magnets in proper sequence.

The carbon contacts are connected by suitable circuits to a series of contacts 136 adapted to be manually and successively connected to the source of supply of electricity by the switch lever 137. They are also connected to a series of similar contacts 138 adapted to be connected to the source of supply of electricity by a swinging lever 139 which is controlled by a barometric pressure bellows device 140.

Normally the electricity is connected directly to the first pair of magnets by the lever 139 at the normal sea level pressure which holds the bellows device compressed, but as the airplane rises in the air and the pressure becomes less the bellows 140 expands and the lever 139 is swung down, thus rotating the cylinder 122 and closing off the flow of air to the hollow arms.

If it is desirable for any reason to operate the control by hand instead of automatically in accordance with the air pressure, the lever 137 is used, and I have arranged the circuit so that the barometric control derives its current through a contact 141 controlled by the rear end of the lever 137, so that the first effect of moving the lever 137 is to cut out the barometric control by cutting off the flow of current thereto.

In Figures 20 and 21 I have illustrated another form of automatic mechanical control. In this form the hollow hub 150 carries the hollow arms 151 and the hub is provided with the forwardly extending tapered projection 152 provided with the air inlets 153. Between the hub proper and the extension are arranged the partition wall 154, provided with openings 155 for admitting air to the arms through the hub. I provide a valve plate 156 in the extension, mounted on pins or posts 157 extending through the partition wall 154. The plate 156 carries tapered valves 158 which are guided in and adapted to close the holes 155. To move the plate 156 I provide a pair of bell cranks 159 pivotally mounted in the hub extension and provided with balls 160 on one arm, the other arm being arranged to bear on the plate 156 and force it to close the holes 155 in an obvious manner, as the speed of rotation of the propeller increases. To resist the action of the balls and control the movement of the plate so that the closing of the holes will occur when desired, I arrange a spring 161 within the hub provided with a sliding ring 162 at one end and against which the posts 157 bear, and bearing at its other end on a longitudinally adjustable ring 163. The ring 163 is adjustable by hand to permit the tensioning of the spring 161 to such a point that the balls 160 cannot close the holes 155 until the propeller rotates faster than a certain predetermined speed.

As mentioned hereinbefore, the vacuum at the back of the blade can be affected either by admitting air through the blade to the back thereof, or by changing the pitch of the blade; obviously, if the pitch of the blade was zero there would practically be no vacuum at all—at least such as would affect in any way the propelling force of the propeller.

It will therefore be understood that a slight change of the pitch will affect the vacuum at the rear of the blade and that by changing the pitch of the blade the vacuum can be destroyed or regulated as desired to produce the result wished.

In Figures 28 and 29 I have shown a simple means for rotating the propeller arms on their radial axis and thus changing their pitch angles. In this form the arms 165 are mounted on the hollow hub 166 by means of suitable ball bearings 167 and by which the arms are held against radial or endwise movement. To hold the arms against rotation and for rotating them as desired, I provide their inner ends each with a segmental face gear 168, all of which mesh with a gear 169 mounted on the shaft 170 upon which the propeller is mounted.

The gear 169 is provided with a long hub 171 which fits the shaft 170 and is adapted to slide longitudinally thereon. The outer surface of the gear 169 is elongated so that the teeth 172 thereon will mesh with the teeth on the inner ends of the arms, even when the gear 169 moves longitudinally on the shaft 170. The gear 169 is held against rotation on the shaft 170 by longitudinal splines or keys 173. These keys are not parallel with the axis of the shaft but are arranged similar to very long pitch screw threads so that as the gear 169 is moved along the shaft it is rotated slightly. As the gear 169 is rotated it causes the arms to be rotated also. To increase the rotation of the arms I make the elongated teeth 172 also inclined to the axis of the shaft, as best shown in Figure 29ª.

For moving the gear 169 longitudinally on the shaft I provide a rotatable sleeve 174 mounted on the shaft 170 and held against longitudinal movement thereon. This sleeve has a screw thread engagement with the hub of the gear 169 at 175 and consequently by rotating the sleeve 174 I provide a very powerful control of the gear 169 and one which the pressure on the arms cannot affect to displace.

For rotating the sleeve 174 I provide preferably an electromagnetic control similar to that already described in reference to Figure 24. That is, I provide shoes or armatures 176 on the sleeve and a ring of electromagnets 177 surrounding same, all within the hub 166. On the rear end of the hub I arrange the concentric contact rings 178 and I provide stationary contacts 179 for maintaining contact with these rings. The rings are connected to the several magnets so that the magnets can be energized in sequence to cause the sleeve 174 to rotate.

I provide a source of electric current 180, one side of which is connected to one of the rings 178 for the return current and the other side of which is connected to the manually operable switch 181, or through the barometrically operated switch 182 to the several other rings. I arrange a control switch 183 between the source of current and the two operating switches, so that I am enabled to operate the control either manually or automatically, in accordance with the atmospheric pressure.

In order to be able to judge quickly as to the position of the armatures 176 I provide a visual signal 184, which is a bank of lamps, one for each of the operative collector rings 178. I connect the lamps together and connect them to the battery or the source of electricity at a point to provide a suitable voltage and each lamp is connected to one of the individual ring circuits so that as current is directed to any specific ring, its particular lamp will light up, thus indicating the position of the armature 176.

In Figure 31 I have illustrated a means for automatically controlling the flow of air through pipes 215 for delivery at the back of solid blades. The control mechanism is similar to that already described in reference to Figure 20. I provide a hollow hub-like casing 216 in which I arrange the air governing mechanism and I project these pipes into this casing so that air can travel out through these pipes in accordance with the control of the flow of air to the casing 216 as already described in relation to Figure 20.

In Figures 32 and 33 I have shown a means of delivering the air at the back of a wooden blade without the friction due to a projecting pipe on the back of the solid blade. In this form I build up the back of the blade 217 (Fig. 33) with an extra thickening member 218, which is thinned down toward the edges of the blade and within this thickened portion I provide grooves 219 running out along the blade and provided at intervals with outlet openings 220. In this instance also I have shown these outlets as elongated transversely to the blade and arranged on an inclination to the axis, their rear ends farther from the axis of the propeller, as adapted to best assist in the withdrawal of the air from the blades and the breaking or destruction of the vacuum.

In Figures 34, 35 and 30, I have shown a simple means of delivering the air at the outside of the back of the blade. This consists of a pipe 221 secured to the back of the blade and extending, as shown in Figure 31, into the hollow hub. This form is particularly well adapted for use on wooden propellers already built. The pipe 221 extends outside along the back of the blade 222 and is provided with spaced outlet openings 223. As best shown in Figure 30, I prefer to provide a series of internal inclined baffles 224 for these outlets, varying from almost nothing for the inner holes to a maximum length for the outer hole so as to force the air to exit at the several holes practically uniformly. I also prefer to nearly close the outer end 225 of the pipe 221 to prevent the throwing of the air out at this point due to the great centrifugal force developed by the high rotation of the propeller.

While I have thus described a number of ways in which the vacuum at the back of a blade of a rotating propeller can be affected, controlled or destroyed, it is to be understood that the several ways fall under the one general proposition of regulating the quantity of power absorbed by the propeller and the work done thereby, by affecting the vacuum at the back of the blade.

While many other ways of affecting and controlling the vacuum at the back of the blade of a propeller will readily suggest themselves to one skilled in the art, I do not limit or confine my invention to the specific method and steps herein described except within the scope of the appended claims.

I claim:

1. The hereindescribed method of controlling the action of propellers which consists in delivering air to the backs of the propeller blades and controlling the quantity of air in inverse proportion to the pressure of the air in which the propeller is operating.

2. The hereindescribed method of controlling propellers which consists in regulating the vacuum behind the several blades of the propeller by the admission of fluid thereto and the regulating or controlling of the quantity of fluid thus admitted in inverse ratio to the density of the medium in which the propeller is operating.

3. The hereindescribed method of controlling or regulating propellers for airplanes which consists in causing air to flow into the vacuum formed behind the blades of the propeller and regulating the quantity of air in inverse ratio to the height of the airplane above sea level.

4. The hereindescribed method of controlling or regulating the power absorption of airplane propellers which consists in admitting air to the vacuum formed behind the propeller blade and regulating the quantity of air thus admitted by a barometrically controlled device.

5. The hereindescribed method of controlling the propeller on an airplane which consists in causing air to be discharged at the backs of the propeller blades and regulating the quantity discharged in inverse ratio to the height of the airplane above sea level.

6. The herein described method of controlling propellers operable in air, which consists in regulating the quantity of power absorbed at any given speed by regulating the vacuum at the back of the propeller blades by delivering air thereto and regulating the quantity of air thus delivered.

In witness whereof, I hereunto subscribe my name this 11th day of July, A. D. 1918

WILLIAM J. H. STRONG.